United States Patent [19]

Wilwerding et al.

[11] 4,439,209

[45] Mar. 27, 1984

[54] THERMAL DECOMPOSITION APPARATUS

[76] Inventors: Carl M. Wilwerding, 2444 SE. Booth St., Roseburg, Oreg. 97470; Robert S. Williams, Rte. 1, Box 719, Sutherlin, Oreg. 97479

[21] Appl. No.: 411,179

[22] Filed: Aug. 25, 1982

[51] Int. Cl.³ .............................................. C10J 3/00
[52] U.S. Cl. ....................................... 48/76; 202/218; 422/233; 422/209; 422/204; 48/203
[58] Field of Search ............... 48/187, 180 S, 203, 48/76; 202/118, 119, 218; 422/164, 233, 232, 209

[56] References Cited

U.S. PATENT DOCUMENTS

| | | | |
|---|---|---|---|
| 871,202 | 11/1907 | Bulley | 202/119 |
| 1,677,757 | 7/1928 | Frank | 201/2.5 |
| 2,265,158 | 12/1941 | Goodell | 201/21 |
| 2,567,802 | 9/1951 | Carr et al. | 260/711 |
| 2,593,279 | 4/1952 | Elgin | 260/720 |
| 2,640,035 | 5/1953 | Brown et al. | 521/43 |
| 2,809,944 | 10/1977 | Sverdrup | 521/43 |
| 2,845,395 | 7/1958 | Sverdrup | 521/44.5 |
| 2,853,742 | 9/1958 | Dasher | 18/48 |
| 2,871,206 | 1/1959 | Mankowich et al. | 528/493 |
| 2,879,245 | 3/1959 | Green | 521/43.5 |
| 2,966,468 | 12/1960 | Dasher | 521/43 |
| 3,178,267 | 4/1965 | Larson | 422/233 |
| 3,272,761 | 9/1966 | Glenn et al. | 521/45 |
| 3,617,226 | 11/1971 | List et al. | 422/209 |
| 3,700,615 | 10/1972 | Scott | 521/44.5 |
| 3,896,059 | 7/1975 | Wakefield et al. | 521/44.5 |
| 4,049,588 | 9/1977 | Lee et al. | 521/43 |
| 4,146,508 | 3/1979 | Maxwell | 521/43 |
| 4,285,773 | 8/1981 | Taciuk | 202/100 |
| 4,344,821 | 8/1982 | Angelo | 202/218 |

Primary Examiner—S. Leon Bashore, Jr.
Assistant Examiner—Michael K. Boyer
Attorney, Agent, or Firm—Townsend & Townsend

[57] ABSTRACT

An apparatus is disclosed for the continuous non-oxidative thermal decomposition of heat-dissociable organic matter to a solid carbon residue, particularly activated carbon, and a mixture of gaseous products, without substantial coking or tar formation. The apparatus involve a cylindrical rotating drum in a substantially horizontal position, into which feed material is introduced at one end and products recovered at the other end. An axial temperature gradient, increasing in the direction of flow, is maintained within the drum, enabling the exercise of a high degree of control over the reaction to fully convert the feed into the desired products.

7 Claims, 3 Drawing Figures

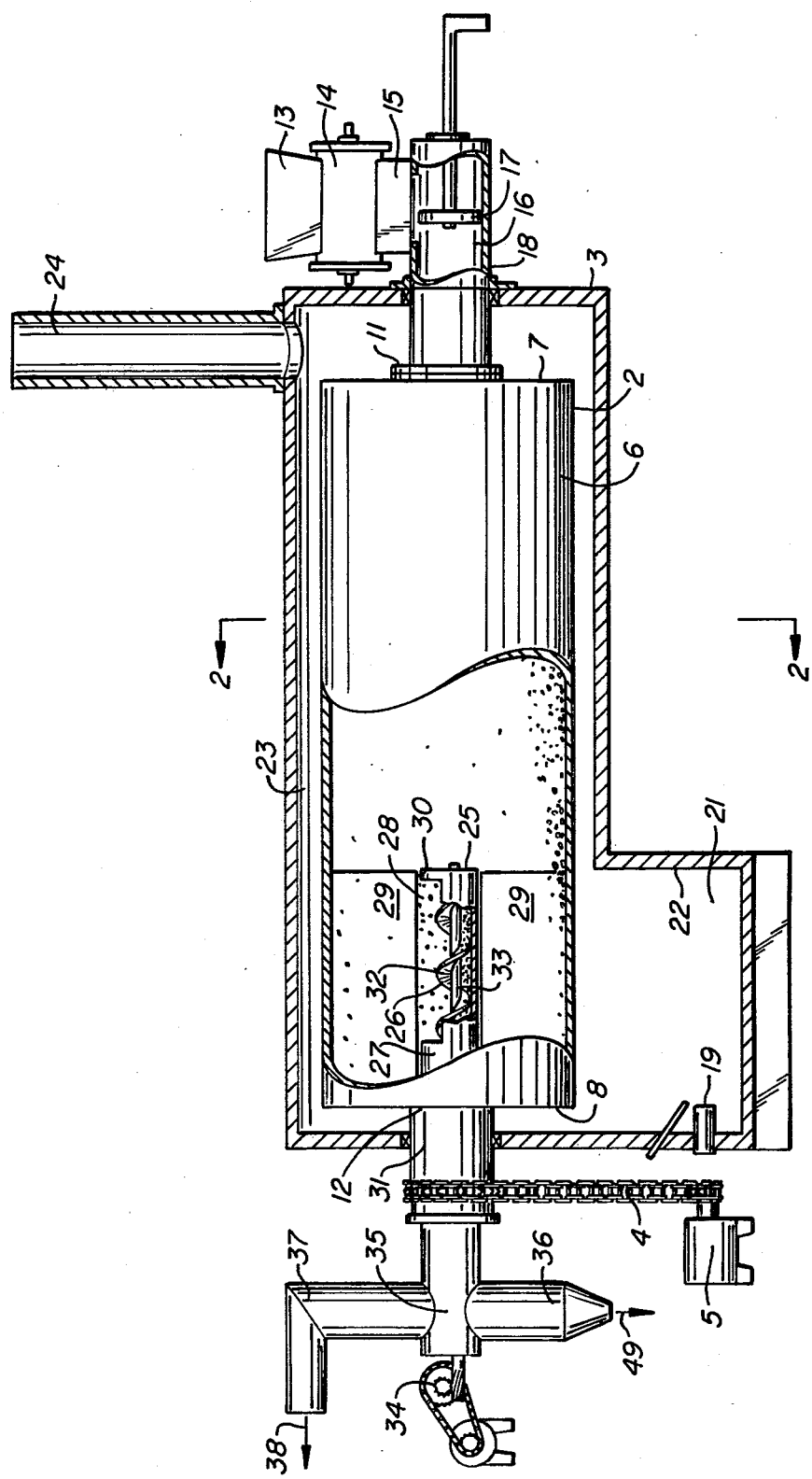

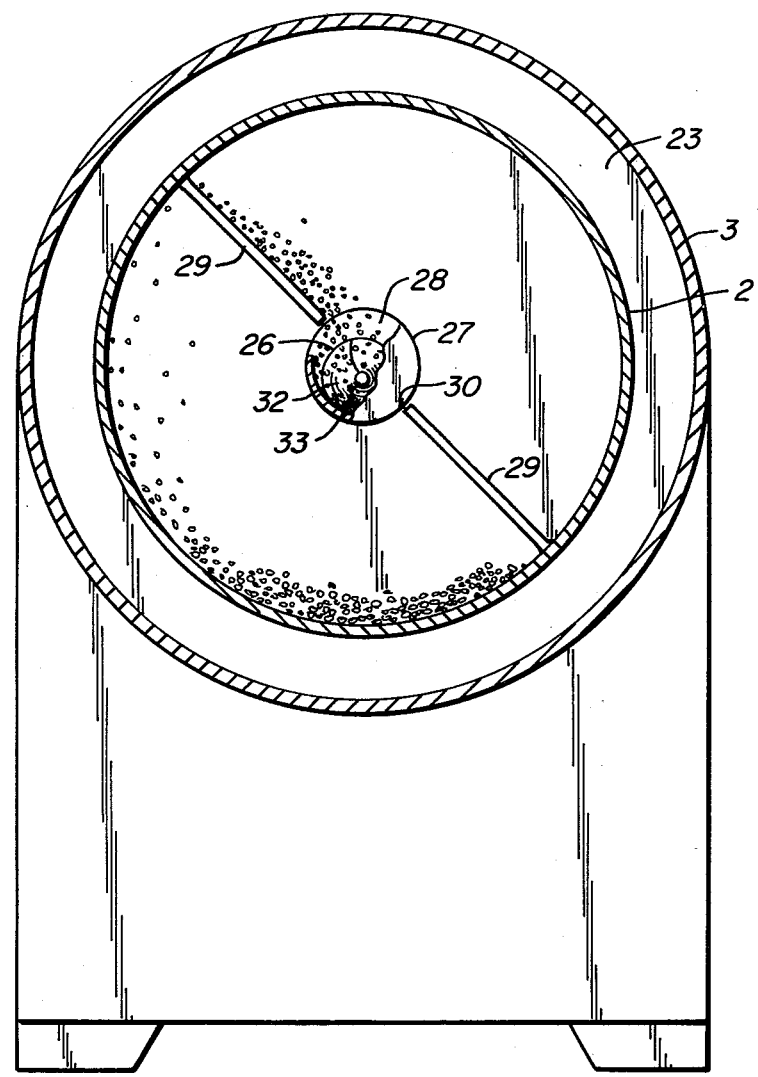
FIG.__2.

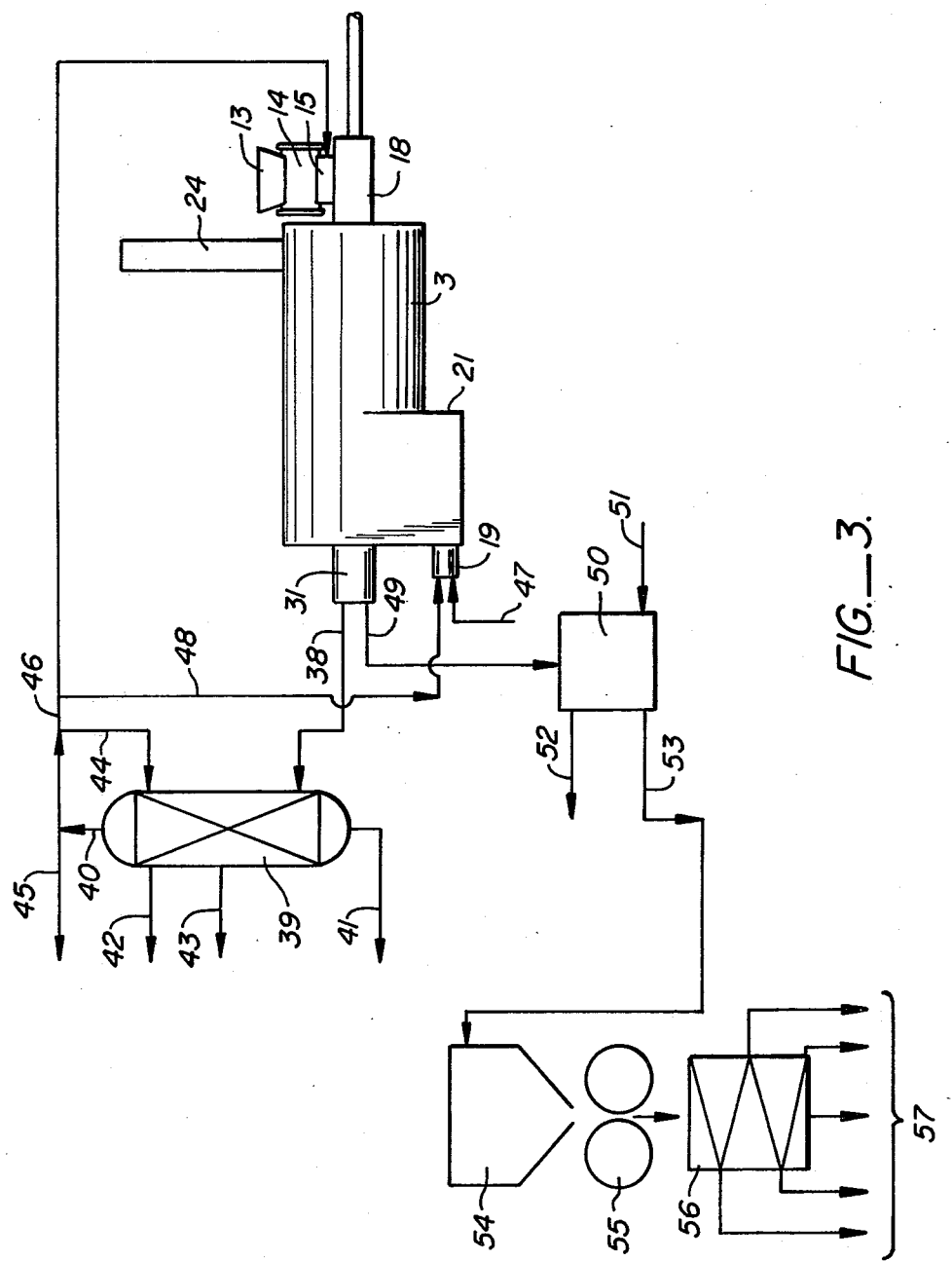
FIG._3.

THERMAL DECOMPOSITION APPARATUS

BACKGROUND OF THE INVENTION

1. Field of the Invention

This invention relates to the processing of organic waste materials for the recovery of useful products therefrom by non-oxidative thermal decomposition.

High molecular weight organic wastes from both industry and the consumer have long presented a disposal problem. Some materials, such as hard nut shells and certain fruit seeds, by-products of the agricultural industry, have a high oil content which discourages the industry from using common means of disposal. Other materials, such as used rubber tires, liberate large amounts of soot and other atmospheric pollutants when burned. A further problem is the high energy consumption inherent in many disposal processes and the loss of useful organic values.

A need therefore exists for an energy efficient and environmentally sound process and apparatus for recovering organic values in a useful form from organic waste materials.

2. Description of the Prior Art

Reaction vessels and processes for the carbonization or destructive distillation of organic material are widely disclosed. Examples of disclosures most pertinent to the present invention are the rotating vessels of Frank, U.S. Pat. No. 1,677,757, issued July 17, 1928; Goodell, U.S. Pat. No. 2,265,158, issued Dec. 9., 1941; and Taciuk, U.S. Pat. No. 4,285,773.

The present invention is of particular interest in the processing of scrap rubber, typically in the form of used automobile tires. A variety of methods for processing scrap rubber are known.

One such method is the "digester" process, in which ground scrap rubber is heated under pressure in a solution of a cellulose-destroying chemical such as caustic soda, calcium chloride and zinc chloride. This treatment destroys the fiber present in the rubber and plasticizes the rubber. Swelling oils are usually added to enhance the process. Such processes are described in Carr, et al., U.S. Pat. No. 2,567,802, issued Sept. 11, 1951; Elgin, U.S. Pat. No. 2,593,279, issued Apr. 15, 1952; Brown, et al., U.S. Pat. No. 2,640,035, issued May 26, 1953; Green, U.S. Pat. No. 2,879,245, issued Mar. 24, 1959; and Soott, U.S. Pat. No. 3,700,615, issued Oct. 24, 1972.

In another method, known as the "heater" process, ground scrap rubber is heated with live steam under pressure, usually with the addition of softening agents, until the rubber becomes plasticized. Descriptions of such processes are found in Mankowich, et al., U.S. Pat. No. 2,871,206, issued Jan. 27, 1959, and Glenn, et al., U.S. Pat. No. 3,272,761, issued Sept. 13, 1966.

Mechanical processes, which involve mechanical working of the rubber at elevated temperature, are described in Sverdrup, U.S. Pat. No. 2,809,944, issued Oct. 15, 1977; Sverdrup, U.S. Pat. No. 2,845,395, issued July 29, 1958; Dasher, U.S. Pat. No. 2,853,742, issued Sept. 30, 1958; Dasher, U.S. Pat. No. 2,966,468, issued Dec. 27, 1960; Lee, et al., U.S. Pat. No. 4,049,588, issued Sept. 20, 1977; and Maxell, U.S. Pat. No. 4,146,508, issued Mar. 27, 1979.

Dissolving processes, using a hydrocarbon solvent at elevated temperatures, are also known. An example is that described by Wakefield, et al., in U.S. Pat. No. 3,896,059, issued July 22, 1975.

SUMMARY OF THE INVENTION

A process and apparatus are provided for the continuous non-oxidative thermal decomposition of non-gaseous heat-dissociable organic matter to a solid carbon residue and a mixture of gaseous products, without substantial coking or tar formation. Also provided are a process and apparatus for the direct conversion of carbonaceous material into activated carbon and a mixture of gaseous products.

Both the structural features of the apparatus and the steps of the process are more fully understood by reference to the attached drawings.

BRIEF DESCRIPTION OF THE DRAWINGS

FIG. 1 is a vertical sectional view of a preferred form of the apparatus of the present invention.

FIG. 2 is a transverse sectional view taken along line 2—2 of FIG. 1.

FIG. 3 is a schematic diagram of a further preferred embodiment of the apparatus and process of the present invention, including units for further treating and handling the reaction product obtained from the apparatus of FIG. 1.

DESCRIPTION OF THE PREFERRED EMBODIMENTS

The present invention resides in an apparatus and process for the thermal decomposition of any non-gaseous heat-dissociable organic matter. Such matter generally includes industrial, municipal and agricultural waste products which contain organic matter susceptible to molecular breakdown by exposure to heat. The organic matter will generally contain a substantial quantity of high molecular weight substances, such as polymers and other long-chain molecules, and is preferably in liquid, slurry or particulate form. Examples include comminuted rubber tires and rubber products in general, plastics, paper, sawdust, wood chips, hard fruit seeds, sewage sludge, waste automotive oil, coal dust, peat, food scraps, fatty meat waste, ground bones, lawn trimmings, hard nut shells, rice hulls, straw and general agricultural wastes.

The invention is particularly useful for the processing of waste rubber, such as discarded vehicle tires, inner tubes, rubber hoses, belts and the like. Typical materials include both natural and synthetic rubbers, such as thiokols, neoprenes, nitrile rubbers, styrene rubbers, butyl rubbers, polybutadiene, silicone rubbers, acrylate rubbers, polyurethanes and fluoro rubbers.

Solid feed materials are preferably comminuted to a size which is conducive to a controllable flow rate and which has sufficient surface exposure to permit complete reaction within an economically convenient length of time. Subject to such considerations, however, the particle size is not critical and can vary over a wide range. Preferably, the particles in the feed will be about one inch or less in their largest linear dimension. Comminution is achieved by any conventional means, such as shredding, grinding or chopping.

Referring to FIG. 1, an air-tight apparatus 1 is shown for the continuous non-oxidative conversion of heat-dissociable organic feed material to a solid carbon residue and a mixture of gaseous products. The term "gaseous products" is intended herein to include both condensible vapors and noncondensible gases, and denotes any substance which is in the gaseous phase under the conditions prevailing at the designated location. The substances which fit this description, of course, may vary from point to point in the overall system.

The apparatus comprises a cylindrical rotating drum 2 mounted inside a stationary furnace 3. The drum is mounted either horizontally or at a slight angle pointing downward in the direction of flow (shown as right to left), depending on the flowable nature of the feed material and the desired residence time. With most feeds, forward flow in the axial direction is sufficiently induced by the rotation of the drum in conjunction with the feed of raw material in one end and the removal of product through the other end. A horizontal configuration is thus preferred.

Rotation of the drum about its axis is provided by any conventional means, the example shown here being a chain gear 4 driven by a hydraulic pump 5. The rotation rate is one of several factors which can be varied to accommodate a wide range of feeds differing in physical form, chemical nature and throughput rate, since it affects both the residence time and the degree of mixing and tumbling of the reaction mixture. A maximum amount of tumbling within the drum is desirable since collisions among particles and between particles and the drum wall promote further particle breakage. This increases the surface area of the particles and thus promotes the separation and escape of gaseous matter from the solids. With liquid and slurry feeds, the rotation rate can be appropriately adjusted to provide mixing throughout the bulk of the fluid for increased surface area as well as improved heat transfer from the drum walls to the fluid.

The optimum rate of rotation further depends on the chemical nature of the feed materials, since the amount of time necessary to achieve complete thermal decomposition while avoiding coking and tar formation varies with the molecular structure. Coking and tar formation cause the accumulation of adherent material inside the drum. In addition to consuming otherwise useful organic values, coke and tar are difficult to remove and inhibit the free flow of gases and solids through the drum. For lighter feed stocks, i.e., those which are easily distilled, a relatively short residence time and hence higher rotation rate is appropriate. For denser materials, the appropriate residence time is longer and the rotation rate slower. Thus, while neither the rotation rate nor the residence time are critical, the appropriate ranges will vary with the dimensions of the drum and the type of material present in the feed. Appropriate operating conditions are readily determined by one of routine skill in the art through an examination of the flow characteristics and product composition. For most applications, a rotation rate ranging from about 0.5 to about 10 revolutions per minute is appropriate, with the preferred range being from about 1 to about 6 revolutions per minute. Similarly, the reactor residence time for most applications will range from about one minute to about twenty minutes, preferably from about two minutes to about ten minutes.

The drum itself consists of a cylindrical drum wall 6 and two end faces 7 and 8 forming, respectively, the upstream and downstream ends of the drum. The interior space of the drum comprises two axially spaced zones, a reaction zone 9 at the upstream end and a removal zone 10 at the downstream end. Feed material is introduced into reaction zone 9 through an inlet port 11 in the center of the upstream end 7, while the reaction products, both solid and gaseous, escape through an outlet port 12 in the center of the downstream end 8.

The feed material is introduced into the reaction zone by any means capable of a controlled rate and the substantial avoidance of air. In the embodiment shown in the drawing, the feed passes through a hopper 13 into a rotary air-lock feed valve 14, which consists of a rotary shaft with radial paddles housed inside a cylindrical housing to form air-tight chambers. The chambers receive the feed material as the shaft rotates and pass it through an air-tight connective port 15 into a piston valve (or ram) chamber 16 consisting of a piston 17 in a cylindrical housing 18. With appropriate coordination of the rotary valve and the piston, the material can be fed at a regular and controlled rate through chambers which remain closed to the atmosphere at all times. When feed stocks such as particulate matter are used, with air occupying the space between the particles, the feed mixture can be readily purged of air before it enters the reaction chamber by the maintenance of a positive pressure within the chamber. Purging is then accomplished by either the use of a small bleed of vapor from the enclosed chamber or permitting the escape of air from the empty chamber as it rotates back up toward the hopper.

The furnace 3 completely encloses the rotating drum 2. The heat source, shown in FIG. 1 as a burner or series of burners 19, is positioned within the furnace to direct heat at the outer surface of the drum wall 6 toward the discharge end of the drum. In the preferred configuration shown, the burners are controlled by pilot lights 20 and positioned within a well 21 extending downward from the end of the furnace. The burner flames are directed against opposing wall 22 of the well which disperses the hot combustion gases before they reach the outer drum wall. The combustion gases proceed through the furnace in the annular space 23 between the drum and the furnace wall, generally moving toward the opposite end of the furnace in the direction opposite to that in which the feed and product mixture inside the drum itself moves. Various design features can be incorporated into the furnace construction to promote the turbulent flow of the combustion gases around the perimeter of the rotating drum, thereby promoting heat transfer by avoiding the formation of a boundary layer adjacent to the drum. As the combustion gases reach the end of the furnace, they escape to the atmosphere through an exhaust stack 24.

The counter-current nature of the flow between the combustion gases and the process gases is essential to the maintenance of a temperature gradient within the reaction chamber itself, increasing in the direction of process gas flow. The relatively low temperature of the feed material also contributes to the temperature gradient, as does the loss of heat to the atmosphere through the furnace walls. A further contribution to the temperature gradient can be made by recycling a portion of the product gases through the reaction chamber in the direction of flow. This is more fully discussed below.

The temperature at the discharge end of the drum chamber and the temperature rise from the inlet end to the discharge end are variable over a wide range depending on the type of material constituting the feed and the degree and type of chemical transformation sought to be achieved within the chamber itself. If one merely seeks to decompose the feed material to char and gaseous products by destructive distillation, a relatively low temperature and short retention time will suffice. If further conversion is sought within the drum it will be necessary to substantially complete the destructive distillation at a point along the length of the drum sufficiently removed from the discharge end to leave sufficient residence time for the further transformation to take place. For example, if water vapor is present in the drum chamber, further residence time will permit the formation of activated carbon from the char. As a further example, the char can be converted to producer gas by reaction with water vapor. In a typical application, both such transformations occur simultaneously. These are achieved by using sufficient heat input and residence time to insure substantially complete carbonization well upstream of the discharge end.

The axial temperature gradient (increasing in the direction of flow) is particularly useful in controlling the various transformations inside the drum chamber while substantially preventing coking and tar formation, since the optimum temperature for carbonization (char formation) is generally several hundred degrees (Fahrenheit) below that for carbon activation or producer gas formation. Thus, depending on whether the object is merely carbonization, or the combination of carbonization with subsequent transformations to produce activated carbon, producer gas or both, the temperature within the reaction zone and the gradient from the inlet to the discharge end can vary considerably. In most applications, however, the temperature difference between the inlet end and the discharge end will be from about 40° F. (50° C.) to about 300° F. (150° C.) and the maximum temperature will range from about 700° F. (370° C.) to about 1,200° F. (650° C.). In preferred embodiments, the temperature increase ranges from about 50° F. (10° C.) to about 200° F. (95° C.), and the maximum ranges from about 800° F. (430° C.) to about 1,000° F. (540° C.). For comminuted scrap rubber, the preferred temperature increase is from about 70° F. to about 150° F., and the preferred temperature maximum is from about 850° F. to 950° F.

Further features affecting the position of the various transformations along the length of the drum, and hence the degree of formation of activated carbon and producer gas, include the drum dimensions, the rate of rotation, the feed rate and all other factors affecting the retention time. Carbon activation and producer gas formation can also be enhanced by adding water to the feed stock, either from an external source or by recycling water from the product stream. Reactions such as producer gas formation which consume water are particularly advantageous since they consume contaminated process water which is otherwise difficult to dispose of.

The removal zone portion of the drum chamber and the means within this zone for moving gaseous and solid product from the chamber are shown in lateral sectional perspective in FIG. 1 and transverse sectional prospective in FIG. 2. Solids are removed from the chamber by a screw conveyor 25 consisting of a rotating screw 26 mounted within a stationary housing 27. The housing contains an opening 28 at the top, forming a trough into which the solid carbon residue formed in the reaction chamber falls as the drum rotates.

Means are provided in the drum for lifting the solids from the inner wall of the drum and directing substantially all of them into the open trough. The means shown in FIGS. 1 and 2 are baffles 29 extending radially from the drum walls toward the central axis of the drum. The number of baffles used is not critical but merely sufficient in number to provide satisfactory flow of the residue. One or more will suffice. Preferably, at least two are used.

The gap between the longitudinal or axial edge 30 of each baffle and the outer wall of the screw trough is small enough to direct substantially all of the solids into the trough opening, yet large enough to prevent the wedging of large particles therein, which might interfere with the rotational motion of the drum. A gap of minimal size provides maximal control of the residence time. Preferred such gaps are approximately one inch or less, more preferred being approximately one-half inch or less. A typical gap width is approximately one-quarter inch.

The baffles extend inward from end face 8 for a sufficient distance (thus forming the removal zone) to provide solids removal, leaving the remainder of the drum interior (the reaction zone) for the desired amount of tumbling action. It will be apparent to those skilled in the art that the optimum baffle configuration and hence the relative sizes of these zones are dictated by the operating conditions as well as the physical and chemical characteristics of the feed material. The dimensions are thus not critical but will be selected together with other factors such as the drum dimensions, rotation rate, temperatures and feed rate to regulate the residence time and operating conditions in order to achieve the type and extent of feed material transformation desired.

The length of the conveyor trough is subject to similar considerations and further enhances control of residence time. Like the baffles, the trough will be short enough to permit sufficient residence time for complete carbonization to occur, plus activation and producer gas formation if these are also intended, yet long enough to collect solids and to remove them before coking or tar formation occur and to provide a sufficient opening for gases to enter the discharge conduit and thereby exit the reaction zone. In most applications, the length of both the discharge screw and the baffles fall within the range of about one-tenth to about one-half of the length of the reaction drum, preferably from about one-sixth to about one-half the length. Preferably, the discharge screw and the baffles are coterminous.

The discharge screw conveyor consists of a spiral flight 32 mounted on a shaft 33 which is rotatably mounted within the trough 27. The trough is mounted to remain stationary while the drum rotates. The flight is designed and mounted such that its outer edge comes sufficiently close to the bottom of the trough to convey substantially all the solid residue falling within the trough. The cross section of the flight, however, occupies only a portion of the cross-sectional areas of the trough 27 and the exit conduit 31, leaving sufficient passage for the process gases to escape from the reaction zone. This can be accomplished for example by the use of a conveyor screw with a ribbon flight and a central shaft coaxial with the trough axis, permitting gases to flow through the space between the shaft and the flight. Alternatively, a closed flight on an eccentric shaft can be used, permitting the flow of gases above the flight. The latter configuration is shown in the drawings and is preferred due to its ability to avoid plugging of the exit conduit in the event of coking, tar formation or condensation around the screw shaft.

The screw 26 extends through the exit conduit 31 to the exterior of the furnace housing 3. The rotation of the screw is achieved by any conventional means, shown in FIG. 1 as a right angle worm drive 34. As the solids and gases leave the reaction zone, they are separated by any conventional means, shown in FIG. 1 as a T-shaped conduit 35 in which the solids fall to a hopper 36 and the vapors pass through an overhead conduit 37.

The chemical transformations inside the reaction zone are conducted in the substantial absence of air. This can be accomplished by any conventional means known to those skilled in the art. One convenient means is to maintain a positive pressure inside the drum chamber, i.e., a pressure in excess of that of the surrounding atmosphere. In addition to preventing the entry of air into the chamber in general, the positive pressure is useful in purging comminuted feed particles in the feed valve chambers before the particles enter the reaction zone. Air is thus prevented from entering with the feed mixture.

The actual pressure in the drum chamber is not critical and can vary over a wide range. For most applications, a pressure within the range of about 0.1 to about 20.0 pounds per square inch gauge (1.007 to 2.4 atmospheres), preferably about 0.5 to about 10.0 (1.03 to 1.7 atmospheres) will be appropriate. Pressure control is achieved by the use of suitable control valves and pressure regulating devices. The optimal use and positioning of such equipment will be readily apparent to one skilled in the art.

For system start-up, the drum chamber, feed valves and connecting conduits are purged with an inert gas and the drum is pre-heated to the desired temperature. Suitable adjustments are made once the feed has been initiated and steady state has been achieved.

A wide variety of operations external to the reaction zone can be used for the treatment, separation and purification of product materials. An illustrative flow sheet is shown in FIG. 3.

The gaseous products 38 leaving the exit conduit 31 of the reactor are fed to a fractionating column 39 which condenses the gases and separates them into fractions according to boiling point ranges. Separation is achieved by any conventional industrial equipment, a tray tower being the most convenient. The type of tray and the dimensions of the tower which will provide the optimum and most efficient separation will depend upon the throughput rate, the composition of the inlet mixture, and the number of fractions to be collected. Suitable tray types include bubble cap, sieve, ballast, float valve and ripple trays. In a typical operation, as shown in FIG. 3, tops 40 and bottoms 41 are removed, together with two intermediate fractions 42 and 43. Separation is further enhanced by a reflux line 44.

The overhead line 40 is divided between an exhaust line 45 and a recirculation line 46 which recirculates a portion of the noncondensed gases through the drum chamber in the direction of flow of the process gases. Recirculation provides several advantages. First, it helps maintain a relatively low temperature at the inlet end of the reaction zone, since the gases in the column overhead are cooler than the process gases inside the drum chamber. The temperature gradient is thus stabilized and regulated. Second, the forced flow of gases overcomes the adverse pressure gradient caused by the temperature gradient along the drum axis, thereby promoting the forward motion of the gases toward the discharge end. This helps stabilize and regulate the residence time of the process material in the reaction zone. Third, the recirculation gas supplies excess water vapor to the reaction zone. This enhances both activation of the char and the formation of producer gas in the reaction zone.

The producer gas formed in the reaction zone passes through the fractionating column and leaves through the overhead line 40. The producer gas can then be used to supplement the import fuel 47 by directing a portion 48 of recirculation line 46 into the burners 19. This is particularly advantageous when gaseous fuel of relatively low heat value is used. The high heat value of producer gas will frequently permit a reduction of the number of burners in use once steady state has been achieved.

For added flexibility of operation, the carbon residue 49 exiting the reaction zone can be fed to a gasification chamber 50 where it is reacted with a gas stream 51 consisting of air, water vapor, carbon dioxide or a combination to produce a gaseous product consisting of any of the synthetic gases commonly known for fuel or synthesis uses, such as producer gas, water gas, synthesis gas, etc. This unit can be advantageously operated to consume substantially all of the process water which is not consumed within the reaction chamber itself. As mentioned above, the process water is frequently contaminated with soot and organic wastes and is not easily disposed of otherwise for environmental reasons.

In the embodiment shown in FIG. 3, the carbon residue 49 exiting the reaction zone is in the form of activated carbon, and becomes further activated inside the optional gasification chamber 46. Further options not shown in the drawing include additional vessels for further product treatment external to either the drum chamber or gasification chamber. A separate carbon activation vessel is one example.

Once activated carbon is formed, it can be size-reduced and classified on site. An example of a suitable apparatus is shown in FIG. 3. The solids are conveyed through line 53 to a cyclone dust collector 54 which separates and removes the fines. The solids then pass through crushing rolls 55 or, alternatively, a grinding operation or a crushing and grinding combination to further reduce the particle size. Size classification is then accomplished by any conventional means, an example of which is a multi-deck vibratory screen 56 as shown, which separates the particles into a plurality of size fractions 57. Since the temperature of the particles may be above that necessary for combustion, it is preferable that an inert atmosphere be maintained throughout the size reduction and classification system. This is readily achieved by purging the system with an inert gas such as nitrogen.

The foregoing description is offered for illustrative purposes only, and the invention is not intended to be limited to the exact construction and operation shown and described. Numerous modifications and variations will be readily apparent to those skilled in the art, while still falling within the spirit and scope of the invention as claimed hereinbelow.

What is claimed is:

1. An apparatus for the continuous non-oxidative thermal decomposition of heat-dissociable organic matter to a solid carbon residue and gaseous products, said apparatus comprising:

a cylindrical drum rotatably mounted inside a furnace in a substantially horizontal position for rotation about its axis, said drum comprising a cylindrical wall and two end faces designated, respectively, an upstream end and a downstream end, said upstream end containing an inlet port at approximately the center thereof for receiving said heat-dissociable organic matter, and said downstream end containing an outlet port at approximately the center thereof for discharging both said solid carbon residue and said gaseous products such that the entire reaction mixture flows from said upstream end to said downstream end, the interior space of said drum comprising two zones in axial relation, the zone at said upstream end being designated a reaction zone and the zone at said downstream end being designated a removal zone, means positioned externally of said drum and at said downstream end of said drum for providing heat within said furnace in the form of heated gases directed at the outer surface of said drum wall toward said downstream end to effect the flow of heated gases in a direction generally counter-current to the flow of said process mixture, thereby producing a temperature gradient within said drum increasing in the direction of flow of said process mixture, feed means for the feed of said heat-dissociable organic matter through said inlet port in the substantial absence of air, a screw conveyor within said removal zone extending through said outlet port, said screw conveyor comprising a non-rotatable trough with an opening at the top thereof to receive both solids and vapors, and a spiral flight mounted on a shaft rotatably mounted within said trough, the outer edge of said flight being sufficiently close to the bottom of said trough to convey substantially all solid matter in said trough out through said outlet port, the cross-section of said flight leaving sufficient open space in said outlet port to permit the passage of said gaseous products therethrough, and centripetal conveying means within said removal zone for conveying substantially all of said solid residue within said removal zone into said trough opening.

2. An apparatus according to claim 1 in which said outlet port is circular, said spiral flight of said screw conveyor is a closed flight and said shaft on which said flight is mounted is eccentric with respect to said outlet port, said shaft and the center of said outlet port being in vertical relation leaving sufficient open space in said outlet port above said shaft to permit the passage of said gaseous products therethrough.

3. An apparatus according to claim 1 further comprising means external to said drum at said downstream end for the separation of said solid residue from said gaseous products.

4. An apparatus according to claim 1 further comprising:

means external to said drum at said downstream end for the separation of said solid residue from said gaseous products, a fractionating column to receive said gaseous products and to divide said products into a plurality of liquid fractions and a gaseous effluent, and means for recycling at least a portion of said effluent to said cylindrical drum through said inlet port.

5. An apparatus according to claim 1 in which said feed means are comprised of: (a) a piston valve which is horizontally disposed for discharge through said inlet port into said reaction zone, (b) a multichamber rotary air-lock feed valve positioned above said piston valve for air-tight discharge into the chamber of said piston valve, and (c) means for coordinating the motion of said piston valve with the rotation of said rotary valve.

6. An apparatus according to claim 1 in which said centripetal conveying means are comprised of at least one baffle within said removal zone, said baffle extending radially from the inner surface of said drum wall in said removal zone toward said trough, the axial edge of said paddle being in sufficient proximity to the outer surface of said trough to cause substantially all of said solid residue to fall into said trough opening as said drum rotates.

7. An apparatus according to claim 1 in which said means providing heat is comprised of at least one burner discharging combustion gases to said furnace.

* * * * *